United States Patent
Boulton

(10) Patent No.: US 11,349,864 B2
(45) Date of Patent: May 31, 2022

(54) DETERMINING SECURITY RISKS FOR SOFTWARE SERVICES IN A CLOUD COMPUTING PLATFORM

(71) Applicant: BlackBerry Limited, Waterloo (CA)

(72) Inventor: Adam John Boulton, Wirral (GB)

(73) Assignee: BlackBerry Limited, Waterloo (CA)

(*) Notice: Subject to any disclaimer, the term of this patent is extended or adjusted under 35 U.S.C. 154(b) by 176 days.

(21) Appl. No.: 16/205,141

(22) Filed: Nov. 29, 2018

(65) Prior Publication Data
US 2020/0177621 A1 Jun. 4, 2020

(51) Int. Cl.
*H04L 29/06* (2006.01)
*H04L 9/40* (2022.01)
*G06F 9/50* (2006.01)
*G06F 21/55* (2013.01)
*H04L 67/60* (2022.01)

(52) U.S. Cl.
CPC ........ *H04L 63/1441* (2013.01); *G06F 9/5072* (2013.01); *G06F 21/552* (2013.01); *H04L 63/1425* (2013.01); *H04L 63/20* (2013.01); *H04L 67/32* (2013.01); *G06F 2221/033* (2013.01)

(58) Field of Classification Search
CPC . H04L 63/1441; H04L 63/1425; H04L 63/20; H04L 67/32; G06F 9/5072; G06F 21/552; G06F 21/629; G06F 2221/033
See application file for complete search history.

(56) References Cited

U.S. PATENT DOCUMENTS

| | | | | |
|---|---|---|---|---|
| 4,937,863 A | * | 6/1990 | Robert | G06F 21/105 705/59 |
| 7,171,374 B1 | * | 1/2007 | Sheehan | G06Q 10/06315 705/7.25 |
| 2016/0043968 A1 | * | 2/2016 | Jacob | H04L 47/827 709/226 |
| 2016/0099975 A1 | * | 4/2016 | Banatwala | H04L 63/105 726/1 |
| 2016/0234251 A1 | * | 8/2016 | Boice | H04L 63/20 |
| 2017/0085587 A1 | * | 3/2017 | Turgeman | G06F 3/03547 |
| 2017/0153906 A1 | * | 6/2017 | Bektas | G06F 9/45558 |
| 2019/0052659 A1 | * | 2/2019 | Weingarten | H04L 41/16 |
| 2019/0158535 A1 | * | 5/2019 | Kedem | H04L 63/1483 |
| 2019/0334903 A1 | * | 10/2019 | Lerner | H04L 67/306 |

OTHER PUBLICATIONS

Extended European Search Report issued in European Application No. 19209527.1 dated Apr. 22, 2020, 6 pages.

* cited by examiner

*Primary Examiner* — Harunur Rashid
(74) *Attorney, Agent, or Firm* — Fish & Richardson P.C.

(57) ABSTRACT

Systems, methods, and software can be used to determine security risks of software services on a cloud computing platform. In some aspects, a computer-implemented method comprises: receiving, by a software service application executing on a cloud computing platform, a request for a software service provided by the software service application; identifying, by the software service application, a resource that is triggered by the request; determining, by the software service application, that the request has a security risk based on a security policy associated with the resource; and in response to the determining, generating, by the software service application, a security notification indicating the security risk.

15 Claims, 2 Drawing Sheets

DETERMINING SECURITY RISKS FOR SOFTWARE SERVICES IN A CLOUD COMPUTING PLATFORM

TECHNICAL FIELD

The present disclosure relates to determining security risks for software services in a cloud-computing platform.

BACKGROUND

In some cases, software services can be provided by a cloud computing platform. A cloud computing platform can provide shared pools of configurable computing resources, e.g., storage, processing power, network connections, to different organizations. These organizations can host their software services on the cloud computing platform. By sharing computing resources on the cloud computing platform, these organizations can reduce expenditures on infrastructure build-up and maintenance cost, while achieving an economy of scale.

DESCRIPTION OF DRAWINGS

Like reference numbers and designations in the various drawings indicate like elements.

DETAILED DESCRIPTION

In some cases, a software application hosted on a server can be subjected to malicious attacks. For example, an attacker can launch a denial-of-service (DoS) attack that would exhaust memory storage or processing power on the server, thereby preventing the application from continuing to provide the software services to legitimate users.

For a software application that is hosted on a cloud computing platform, the cloud computing platform can monitor the resource usage by the software application. In some implementations, the resource that is available to the software application on the cloud computing platform is provisioned. The provision may set a limit of resource usage for a configured duration, e.g., in a day. The resource provision can be configured based on the service agreement between a service provider that owns or operates the software application and the operator that owns or operates the cloud computing platform. In some implementations, the cloud computing platform can monitor the resource usage by the software application, and block the software application from continuing to use the resource if the limit has been reached. The cloud computing platform can further indicate to the software application that such a situation occurs, e.g., in an error message, and the software application can communicate to the service provider, e.g., by sending an email, a short message service (SMS) message, or a voice call to alert the service provider of the security risks. However, in some cases, the communication resources that may be used to send such an alert, e.g., emails, SMS messages, or messages from messenger service applications such as WHATSAPP or FACEBOOK MESSENGERS, are themselves subject to the service provision by the cloud computing platform. Therefore, if the communication resource has been exhausted by a malicious attacker, the software application would not be able to inform the service provider the presence of such attack, and the software service would remain unavailable until the configured time period has passed. Moreover, in some cases, the attack may be emulate normal behavior of the software service, e.g., a number of password updates or profile updates for the same or different users that would trigger email notifications, and thus may not be detected by the software service or the cloud computing platform. In addition, once the communication resources provisioned by the software service have been exhausted and the communication between the software application hosted on the cloud computing platform and the service provider is cut off, the attacker may launch other types of malicious attacks to the software application and the service provider may not be informed.

Figure 1:
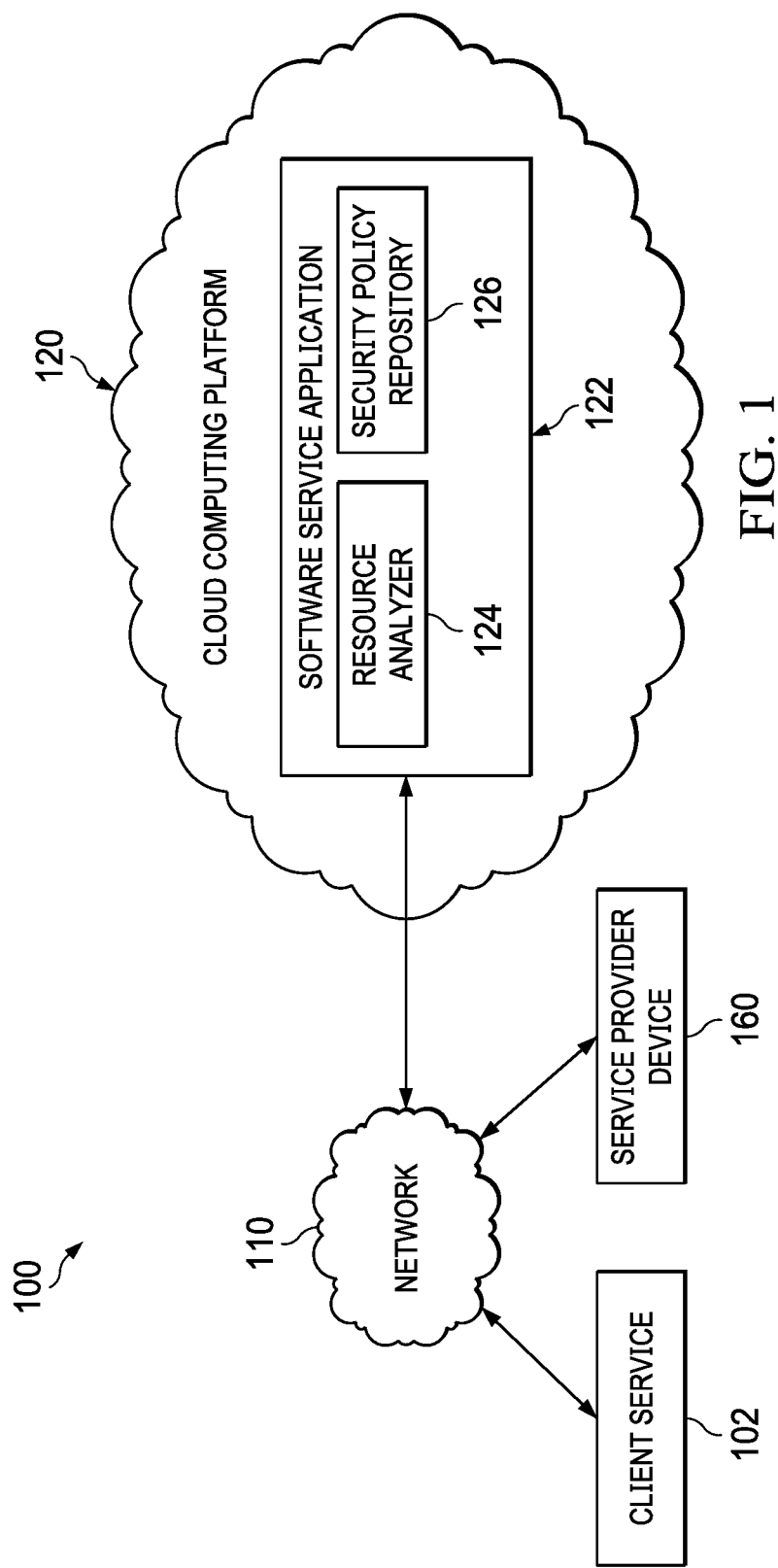
FIG. 1 is a schematic diagram showing an example communication system that determines security risks of software services on a cloud computing platform, according to an implementation.
Figure 2:
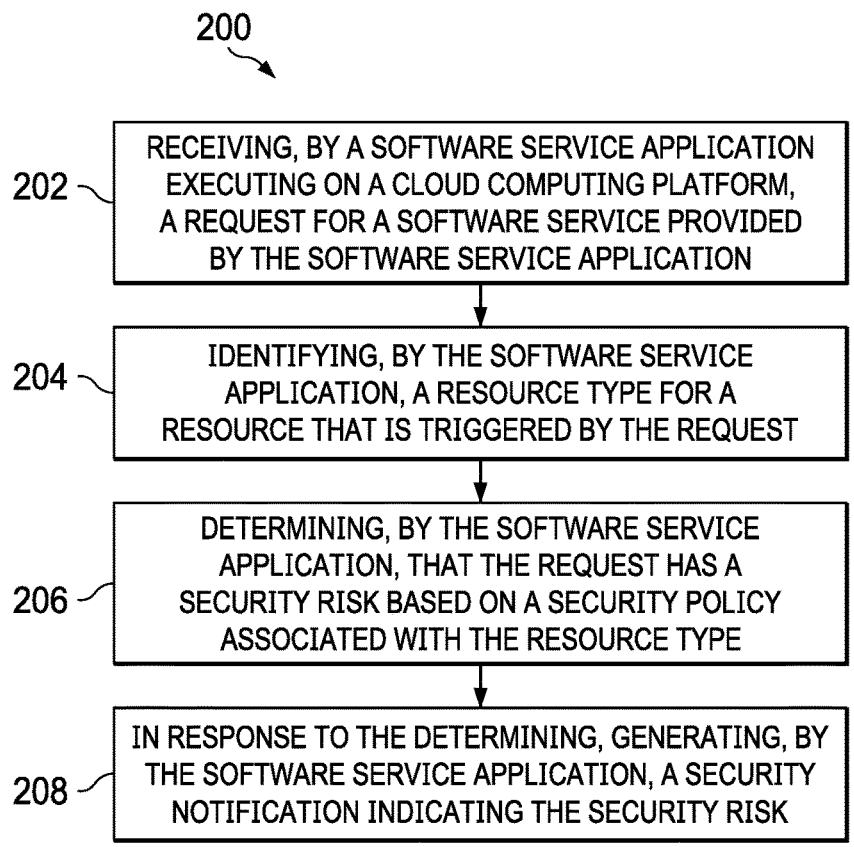
FIG. 2 is a flow diagram showing an example method that determines security risks of software services on a cloud computing platform, according to an implementation.
Figure 3:
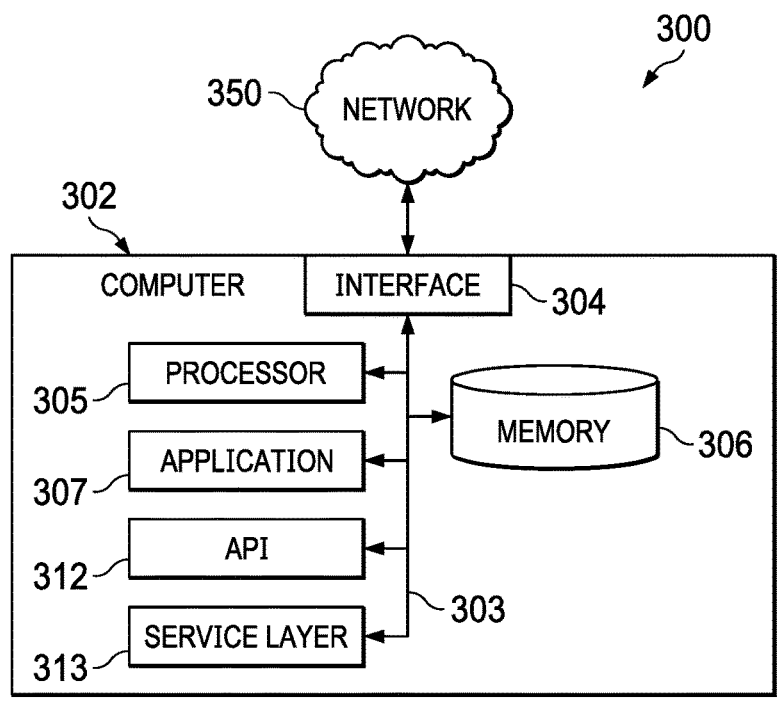
FIG. 3 is a high-level architecture block diagram of a computing system, according to an implementation.

In some implementations, security policies for one or more resources that are provisioned for the software application on the cloud computing platform can be configured. The one or more resources can be a communication resource such as email, message, or telephonic call. The software application can analyze the request for software service received from a client device, determine the operations that are triggered to complete the task as requested, and identify the resource that would be triggered by such operations. The software application can further check the security policy configured for the identified resource to determine whether the request has a security risk. The software application can generate a security notification and transmit the security notification to the service provider if the request has a security risk. FIGS. 1-3 and associated descriptions provide additional details of these implementations. This approach enables the service provider to be notified the security risk before the resource has been exhausted, and respond accordingly.

FIG. 1 is a schematic diagram showing an example communication system 100 that determines security risks of software services on a cloud computing platform, according to an implementation. At a high level, the example communication system 100 includes a client device 102, a service provider device 160, and a cloud computing platform 120 that are communicatively coupled with a network 110.

The cloud computing platform 120 is a cloud computing platform that provides software services. The cloud computing platform 120 can be implemented using one or more servers hosted on the Internet. In cloud computing platform 120 includes a shared pool of configurable computing resources, including e.g., communication resources, memory storage resources, processing power resources. The cloud computing platform 120 can be a public cloud, private cloud, or a hybrid cloud. The cloud computing platform 120 can include cloud components such as cloud service, frontend platform, cloud storage, cloud infrastructure and other components.

As shown in FIG. 1, the cloud computing platform 120 includes a software service application 122. The software service application 122 is a software program that executes on the cloud computing platform 120 and provides a software service to the client device 102. The software service can be a Software as a Service (SaaS), an Infrastructure as a Service (IaaS), a Platform as a Service (PaaS), a Mobile backend as a service (MBaaS), a Function as a service (FaaS), a Serverless computing service or other software services that can be hosted on the cloud computing platform 120. The software service application 122 can be developed, maintained, or both by a service provider. The service provider can have an agreement with the operator of the cloud computing platform 120 to host the software service on the cloud computing platform 120, and provision a set of resources for the software service application 122. When executed, the software service application 122 can use the provisioned resources on the cloud computing platform 120 to provide the software service.

The software service application 122 includes a resource analyzer 124. The resource analyzer 124 is a software module that is configured to analyze a request for software service, identify a resource that is triggered by the request, and determine whether the request has a security risk based on security policy configured for the identified resource. The resource analyzer 124 can also generate a security notification and instruct the cloud computing platform 120 to transmit the security notification to the service provider device 160. The resource analyzer 124 can also instruct the software service application 122 whether to execute the operations triggered by the request and use the identified resource. FIGS. 2-3 and associated descriptions provide additional details of these implementations.

The software service application 122 includes a security policy repository 126. The security policy repository 126 represents a software module that is configured to store or access security policies for resource usage by the software service application 122. The security policies can indicate one or more usage thresholds that would trigger a security notification for different resources. The security policies can be configured according to the provisioning of resources on the cloud computing platform 120 for the software service application 122. The security policies can also be configured and updated based on resource usage patterns of the software service application 122. FIGS. 2-3 and associated descriptions provide additional details of these implementations.

The service provider device 160 is a computing device that is owned or operated by the service provider that provides software services through the software service application 122 on the cloud computing platform 120. The service provider device 160 can be configured to receive security notifications transmitted from the cloud computing platform 120, respond to the security notification with a command to instruct whether or not to execute the request, to block the client device 102 that sends the request, or both. FIGS. 2-3 and associated descriptions provide additional details of these implementations.

The client device 102 represents a device that can access the software service application 122 to receive the software service. In some implementations, the client device 102 can execute a client application, e.g., a web browser, a mobile device app, a thin client, or a terminal emulator. The client application can generate a request to be transmitted over the network 110 to the software service application 122 that is hosted on the cloud computing platform 120. The request can be a request to initiate one or more tasks of the software service. Examples of the tasks can include a sign-up of a new user, a password reset, or a user profile update. The software service application 122 can execute operations triggered by the request to complete these tasks.

Turning to a general description, the client device 102 or the service provider device 160 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example method 200 that determines security risks of software services on a cloud computing platform, according to an implementation. The method 200 can be implemented by a software service application on a cloud computing platform, e.g., the software service application 122 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where the software service application receives a request for a software service. The request can be transmitted from a client device, e.g., the client device 102 shown in FIG. 1. The software service can be a software service that is provided through a web-based protocol, a client-server based protocol, or any other software protocol that provides communications between the client device and the cloud computing platform. For example, the software service can be a software as a service (SaaS) application such as SALESFORCE, or OFFICE 365. In some implementations, the request can be generated by a client application that executes on the client device 102. Examples of the client application includes a web browser, a JAVA script, or a mobile device app. In some operations, the client application, the software service application, or both are developed, and maintained by a service provider. In one example, the software service is provided through a web-based protocol, the client application is a browser executed on the client device, and the request is a Hypertext Transfer Protocol (HTTP) or a Hypertext Transfer Protocol Secure (HTTPS) message.

At 204, the software service application identifies a resource that is triggered by the request. The software service application processes the request to provide corresponding functionality of software service. For example, the request can be for a sign-up of a new user, a password reset, a user profile update, or etc. Different requests can trigger different operations of the software service application and correspondingly, usages of different resources. In one example, the request can trigger an operation of retrieving or storing data accessible by the software service application, e.g., retrieving a stored file on the cloud computing platform or storing updates to the stored file. In such an example, the resource can be memory storage. In another example, the request can trigger a computing operation. In such an example, the resource can be processing power. In yet another example, the request can trigger a communication operation that uses a communication resource, e.g., sending an email, sending a short message service (SMS) message or a message of a messenger service application, initiating a phone call to a specific number. In these cases, the resource can be email resource, messaging resource, or telephonic resource, respectively. In some cases, the request can trigger more than one resource. Consequently, more than one resources can be identified.

At 206, the software service application determines that the request has a security risk based on a security policy for the resource. In some implementations, different security policies can be configured for different resources. The service provider can configure these different security policies based on a service provision of the software service provided by the software service application. The service provision indicates the resource usage limit by the software service application on the cloud computing platform. In some cases, the service provision can be set based on the service agreement negotiated between the service provider and the operator of the cloud computing platform. In one example, a service provision can indicate that a limited number of emails can be sent during a configured period by the software service on the cloud computing platform. In another example, a service provision can indicate that a limited number of SMS messages can be sent, or a limited number of telephonic calls can be initiated during a configured period by the software service on the cloud computing platform. In yet another example, a service provision can indicate that a limited number of storage space or computing power can be used by the software service.

In some cases, the security policies for different resources can be configured based on the service provisions of the respective resources. For example, if a service provision indicates that a limited number of SMS messages can be sent during a configured period by the software service, the security policy can be set to a threshold number of SMS messages during the same configured period, while the threshold number is lower than the limited number in the service provision. Therefore, the security policy can be violated before the resource limited by the service provision is exhausted. The software service application keeps track of the resource usage for different resources. For each identified resource resources that is triggered by the request, the software service can determine if the triggered resource usage would violate the security policy for the respective resource. By monitoring the resource triggered by the request and checking against the corresponding security policy, the software service application can detect that a request may have a security risk, based on a determination that the request triggers a usage of a resource that is close to exhaustion according to the security policy, before the resource is exhausted according to the service provision. In some cases, if the security policy is violated, the software service application can determine not to execute the operation triggered by the request, so that the resource is not reserved.

Alternatively or additionally, the security policy can be set or updated based on a usage pattern of the software service. For example, the software service application can monitor historic usages of a resource, and generates statistic parameters of the usage patterns. Examples of the statistic parameters can include average values, variance values, median values, or other values. The statistic parameters can be generated for different length of time periods such as a configured number of days or hours. The statistic parameters can also be generated for specific time periods, e.g., different time of a day (morning, afternoon, late night such as 10 pm to 6 am), different day of a week, etc. The software service application can use one or more statistic parameters to set the security policy for a resource. For example, if average number of emails triggered by the software service is 50 a day, and the variance is 50 a day, the software service can include a threshold number of 100 emails in a day in the security policy for emails, while the service provision limits the email is 200 a day. This approach enables the software service application to detect a security risk based on abnormal usages.

At 208, in response to determining that the request has a security risk, the software service application generates a security notification indicating the security risk. The security notification can indicate the resource that was triggered by the request, information of the security policy that is violated by the request, e.g., the usage threshold that is met or exceeded, the security provision of the resource, or any combinations thereof.

In some cases, the security policy for a resource can include multiple thresholds. These different thresholds can correspond to different levels of security. Accordingly, different notifications can be generated if different thresholds have been met. The notification can indicate the corresponding level of security risk. In one example, for the email resource, the service provision has a limit of 200 a day, the software service application can set a first threshold of 100, determined based on the usage pattern discussed previously, and a second threshold of 180, determined based on the service provision. If the request triggers an email usage that meets the first threshold, the first notification is generated, indicating a first level of security risk of a resource usage that exceeds the normal usage. In some cases, the software service application can still execute the operation triggered by the request when the first threshold is met. If the request triggers an email usage that meets the second threshold, the second notification is generated, indicating that a second level of security risk of a resource usage that is close to exhaustion. The software service application can refrain from performing the operation triggered by the request, or hold the operation until further authorization.

In some cases, the security notification can be outputted at the cloud computing platform, e.g., displayed on a graphic user interface on a device on the cloud computing platform. Alternatively or additionally, the security notification can be transmitted to the service provider that provides the software service. In some implementations, the security notification can be transmitted using a communication resource of the cloud computing platform, e.g., an email, an SMS message, or a telephonic call. The service provider can receive the security notification and determine the corresponding actions. In some implementations, an administration software application executed on a device associated of the service provider can be configured to receive the security notification and generate responsive actions. The responsive actions can include sending an alert to an administrator of the cloud computing platform, outputting a security alert to an administrator of the service provider, issuing a command to the software service application to indicate whether or not to process the request that triggers the security notification, issuing a command to the software service application to block the client device that transmits the request from further receiving software services from the software service application, or any combinations thereof. In some cases, different response actions can be configured to correspond to different levels of security risks discussed previously. For example, if a lower level of security risk is indicated by the security notification, the client device can be blocked for a shorter duration. If a higher level of security risk is identified, the client device can be blocked for a longer duration.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure to process resource requests. For example, the computer 302 can be used to implement a computing device that executes the software service application 122 shown in FIG. 1. The computer 302 can also be used to implement other computing devices, e.g., the service provider device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350 (whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   receiving, by a software service application executing on a cloud computing platform, a request for a software service provided by the software service application, wherein the software service application provides the software service to multiple users;
   identifying, by the software service application, a resource that is triggered by the request;
   determining, by the software service application, that the request has a security risk based on a security policy associated with the resource, wherein the security policy comprises a threshold amount for aggregate usages of the resource for multiple users on the cloud computing platform by the software service application, and the determining that the request has the security risk comprises:
    determining previous aggregate usages of the resource for multiple users by the software service application;
    determining that the threshold amount would be exceeded based on the previous aggregate usages of the resources and a usage of the resource according to the request; and
    determining that the request has the security risk in response to the determining that the threshold amount would be exceeded;
in response to the determining that the request has the security risk, generating, by the software service application, a security notification indicating the security risk;
updating the security policy based on a usage pattern of aggregate usages of the resource by multiple users of the software service;
identifying a client device that transmits the request; and
preventing the identified client device from receiving the software service for a configured duration.

2. The method of claim 1, wherein the security policy for the resource is associated with a resource provision of the resource on the cloud computing platform for the software service.

3. The method of claim 1, wherein the resource is a communication resource.

4. The method of claim 3, wherein the resource is at least one of an email resource, a messaging resource, or a telephonic call resource.

5. The method of claim 1, wherein the security policy comprises a usage threshold of the resource within a configured duration.

6. A device, comprising:
    at least one hardware processor; and
    one or more computer-readable storage media coupled to the at least one hardware processor and storing programming instructions for execution by the at least one hardware processor, wherein the programming instructions, when executed, cause the at least one hardware processor to perform operations comprising:
        receiving, by a software service application executing on a cloud computing platform, a request for a software service provided by the software service application, wherein the software service application provides the software service to multiple users;
        identifying, by the software service application, a resource that is triggered by the request;
        determining, by the software service application, that the request has a security risk based on a security policy associated with the resource, wherein the security policy comprises a threshold amount for aggregate usages of the resource for multiple users on the cloud computing platform by the software service application, and the determining that the request has the security risk comprises:
            determining previous aggregate usages of the resource for multiple users by the software service application;
            determining that the threshold amount would be exceeded based on the previous aggregate usages of the resources and a usage of the resource according to the request; and
            determining that the request has the security risk in response to the determining that the threshold amount would be exceeded;
        in response to the determining that the request has the security risk, generating, by the software service application, a security notification indicating the security risk;
        updating the security policy based on a usage pattern of aggregate usages of the resource by multiple users of the software service;
        identifying a client device that transmits the request; and
        preventing the identified client device from receiving the software service for a configured duration.

7. The device of claim 6, wherein the security policy for the resource is associated with a resource provision of the resource on the cloud computing platform for the software service.

8. The device of claim 6, wherein the resource is a communication resource.

9. The device of claim 8, wherein the resource is at least one of an email resource, a messaging resource, or a telephonic call resource.

10. The device of claim 6, wherein the security policy comprises a usage threshold of the resource within a configured duration.

11. One or more non-transitory computer-readable media containing instructions which, when executed, cause a computing device to perform operations comprising:
    receiving, by a software service application executing on a cloud computing platform, a request for a software service provided by the software service application, wherein the software service application provides the software service to multiple users;
    identifying, by the software service application, a resource that is triggered by the request;
    determining, by the software service application, that the request has a security risk based on a security policy associated with the resource, wherein the security policy comprises a threshold amount for aggregate usages of the resource for multiple users on the cloud computing platform by the software service application, and the determining that the request has the security risk comprises:
        determining previous aggregate usages of the resource for multiple users by the software service application;
        determining that the threshold amount would be exceeded based on the previous aggregate usages of the resources and a usage of the resource according to the request; and
        determining that the request has the security risk in response to the determining that the threshold amount would be exceeded; and
    in response to the determining that the request has the security risk, generating, by the software service application, a security notification indicating the security risk;
    updating the security policy based on a usage pattern of aggregate usages of the resource by multiple users of the software service;
    identifying a client device that transmits the request; and
    preventing the identified client device from receiving the software service for a configured duration.

12. The one or more computer-readable media of claim 11, wherein the security policy for the resource is associated with a resource provision of the resource on the cloud computing platform for the software service.

13. The one or more computer-readable media of claim 11, wherein the resource is a communication resource.

14. The one or more computer-readable media of claim 13, wherein the resource is at least one of an email resource, a messaging resource, or a telephonic call resource.

15. The one or more computer-readable media of claim 11, wherein the security policy comprises a usage threshold of the resource within a configured duration.

* * * * *